(12) United States Patent
Yuan et al.

(10) Patent No.: US 11,658,814 B2
(45) Date of Patent: *May 23, 2023

(54) SYSTEM AND METHOD FOR ENCRYPTION AND DECRYPTION BASED ON QUANTUM KEY DISTRIBUTION

(71) Applicant: Alibaba Group Holding Limited, Grand Cayman (KY)

(72) Inventors: Peng Yuan, Beijing (CN); Zhiqiang Wang, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 555 days.

This patent is subject to a terminal disclaimer.

(21) Appl. No.: 16/876,630

(22) Filed: May 18, 2020

(65) Prior Publication Data

US 2020/0280437 A1 Sep. 3, 2020

Related U.S. Application Data

(63) Continuation of application No. 15/481,338, filed on Apr. 6, 2017, now Pat. No. 10,693,635.

(30) Foreign Application Priority Data

May 6, 2016 (CN) .......................... 201610298847.1

(51) Int. Cl.
*H04L 9/08* (2006.01)
*H04L 9/40* (2022.01)
*H04L 67/1097* (2022.01)

(52) U.S. Cl.
CPC .......... *H04L 9/0852* (2013.01); *H04L 9/0822* (2013.01); *H04L 9/0891* (2013.01);
(Continued)

(58) Field of Classification Search
None
See application file for complete search history.

(56) References Cited

U.S. PATENT DOCUMENTS 5,307,410 A ‡ 4/1994 Bennett ................. H04L 9/0852
380/25
5,675,648 A ‡ 10/1997 Townsend ............. H04L 9/0858
380/25
(Continued)

FOREIGN PATENT DOCUMENTS

CN 104662599 5/2015
CN 106375840 2/2017
(Continued)

OTHER PUBLICATIONS

J G Rarity et al. "Ground to satellite secure key exchange using quantum cryptography", New Journal of Physics 2002.‡
(Continued)

*Primary Examiner* — Richard A McCoy
(74) *Attorney, Agent, or Firm* — Shun Yao; Yao Legal Services, Inc.

(57) ABSTRACT

One embodiment of the present invention provides a system for facilitating storage encryption and decryption. During operation, the system receives a first request to encrypt data which is to be stored on a remote device, wherein the first request indicates the data. The system updates a key based on a dynamic key refreshment protocol. The system determines a key label for the updated key. The system encrypts the data based on the updated key, and transmits the encrypted data and the key label to the remote device, thereby facilitating secure encryption and decryption of data on the remote device.

18 Claims, 10 Drawing Sheets

(52) U.S. Cl.
CPC ............. *H04L 9/0894* (2013.01); *H04L 9/40* (2022.05); *H04L 63/062* (2013.01); *H04L 67/1097* (2013.01)

(56) References Cited

U.S. PATENT DOCUMENTS

| | | | |
|---|---|---|---|
| 6,263,437 B1 | 7/2001 | Liao | |
| 6,505,247 B1 ‡ | 1/2003 | Steger | G05B 19/00 700/9 |
| 6,801,626 B1 | 10/2004 | Nambu | |
| 8,041,335 B2 | 10/2011 | Khetawat | |
| 8,266,433 B1 | 9/2012 | Przykucki | |
| 8,719,923 B1 * | 5/2014 | Miller | G06F 21/34 713/172 |
| 8,984,285 B1 * | 3/2015 | Dorwin | H04L 9/0631 713/151 |
| 8,990,550 B1 | 3/2015 | Hushon | |
| 9,077,577 B1 ‡ | 7/2015 | Ashrafi | H04L 27/3405 |
| 9,130,742 B2 ‡ | 9/2015 | Yao | H04L 9/0827 |
| 9,294,267 B2 ‡ | 3/2016 | Kamath | H04L 9/0863 |
| 9,323,901 B1 ‡ | 4/2016 | Nair | G06F 21/10 |
| 9,698,979 B2 ‡ | 7/2017 | Armstrong | H04L 63/0442 |
| 9,830,467 B1 * | 11/2017 | Harold | H04L 9/0656 |
| 9,887,976 B2 ‡ | 2/2018 | Hughes | H04L 9/3226 |
| 2001/0023416 A1 ‡ | 9/2001 | Hosokawa | G06Q 30/04 705/51 |
| 2005/0071632 A1 ‡ | 3/2005 | Pauker | H04L 63/0442 713/165 |
| 2005/0071677 A1 ‡ | 3/2005 | Khanna | H04L 67/34 726/4 |
| 2005/0135620 A1 ‡ | 6/2005 | Kastella | H04L 9/12 380/25 |
| 2005/0144440 A1 ‡ | 6/2005 | Catherman | H04L 9/3236 713/15 |
| 2005/0144484 A1 ‡ | 6/2005 | Wakayama | G06F 21/36 726/19 |
| 2005/0259825 A1 ‡ | 11/2005 | Trifonov | H04L 9/0858 380/27 |
| 2006/0026693 A1 ‡ | 2/2006 | Bade | G06F 21/575 726/34 |
| 2006/0056630 A1 ‡ | 3/2006 | Zimmer | G06N 10/00 380/25 |
| 2006/0101266 A1 | 5/2006 | Klassen | |
| 2006/0155922 A1 | 7/2006 | Gorobets | |
| 2007/0016794 A1 ‡ | 1/2007 | Harrison | H04L 9/0656 713/18 |
| 2007/0076889 A1 ‡ | 4/2007 | DeRobertis | H04L 9/083 380/27 |
| 2007/0113078 A1 * | 5/2007 | Witt | G06F 21/602 713/165 |
| 2007/0147292 A1 ‡ | 6/2007 | Van Ewijk | H04L 47/782 370/32 |
| 2007/0192598 A1 ‡ | 8/2007 | Troxel | H04L 9/0858 713/16 |
| 2008/0065881 A1 * | 3/2008 | Dawson | H04L 9/0822 713/165 |
| 2008/0114983 A1 ‡ | 5/2008 | Sherkin | H04L 63/083 713/17 |
| 2008/0123859 A1 ‡ | 5/2008 | Mamidwar | H04L 9/0631 380/27 |
| 2008/0165973 A1 ‡ | 7/2008 | Miranda Gavillan | G06F 21/6209 380/27 |
| 2008/0219449 A1 ‡ | 9/2008 | Ball | G06F 21/80 380/27 |
| 2008/0222734 A1 ‡ | 9/2008 | Redlich | H04L 63/02 726/26 |
| 2008/0253572 A1 * | 10/2008 | Gassoway | G06F 21/602 380/278 |
| 2009/0019285 A1 | 1/2009 | Chen | |
| 2009/0034733 A1 ‡ | 2/2009 | Raman | H04L 9/083 380/27 |
| 2009/0055892 A1 ‡ | 2/2009 | Lu | H04L 9/3226 726/2 |
| 2009/0092252 A1 ‡ | 4/2009 | Noll | H04L 9/0891 380/27 |
| 2009/0106551 A1 ‡ | 4/2009 | Boren | H04L 9/3226 713/15 |
| 2009/0125444 A1 ‡ | 5/2009 | Cochran | G06Q 30/0185 705/50 |
| 2009/0147958 A1 | 6/2009 | Calcaterra | |
| 2009/0193184 A1 | 7/2009 | Yu | |
| 2009/0204812 A1 ‡ | 8/2009 | Baker | H04L 65/607 713/16 |
| 2009/0262942 A1 | 10/2009 | Maeda | |
| 2009/0271634 A1 ‡ | 10/2009 | Boult | H04L 9/3231 713/18 |
| 2010/0132015 A1 | 5/2010 | Lee | |
| 2010/0169953 A1 ‡ | 7/2010 | Hofer | H04L 63/08 726/3 |
| 2010/0199336 A1 ‡ | 8/2010 | Tan | H04L 63/0846 726/6 |
| 2010/0211787 A1 ‡ | 8/2010 | Bukshpun | H04L 9/065 713/17 |
| 2010/0265077 A1 ‡ | 10/2010 | Humble | G08B 13/124 340/60 |
| 2010/0277435 A1 | 11/2010 | Han | |
| 2010/0281254 A1 | 11/2010 | Carro | |
| 2010/0299526 A1 | 11/2010 | Wiseman | |
| 2011/0069972 A1 ‡ | 3/2011 | Wiseman | H04L 9/0852 398/18 |
| 2011/0099367 A1 ‡ | 4/2011 | Thom | H04L 9/0877 713/15 |
| 2011/0126011 A1 ‡ | 5/2011 | Choi | H04L 9/0852 713/16 |
| 2011/0167503 A1 ‡ | 7/2011 | Horal | G06F 21/10 726/33 |
| 2011/0209202 A1 ‡ | 8/2011 | Otranen | H04L 9/3213 726/4 |
| 2011/0213979 A1 ‡ | 9/2011 | Wiseman | H04L 9/0855 713/17 |
| 2011/0231615 A1 ‡ | 9/2011 | Ober | H04L 67/2842 711/14 |
| 2011/0302408 A1 | 12/2011 | McDermott | |
| 2012/0032781 A1 | 2/2012 | Moon | |
| 2012/0045002 A1 ‡ | 2/2012 | Zivkovic | H04L 67/06 375/25 |
| 2012/0084570 A1 | 4/2012 | Kuzin | |
| 2012/0087500 A1 ‡ | 4/2012 | Ukita | H04L 9/0858 380/256 |
| 2012/0166993 A1 ‡ | 6/2012 | Anderson | G06F 1/1639 715/77 |
| 2012/0177201 A1 ‡ | 7/2012 | Ayling | H04L 9/0858 380/27 |
| 2012/0204032 A1 | 8/2012 | Wilkins | |
| 2012/0210408 A1 ‡ | 8/2012 | Lu | H04L 63/0846 726/6 |
| 2012/0250863 A1 ‡ | 10/2012 | Bukshpun | H04L 9/14 380/27 |
| 2012/0265892 A1 ‡ | 10/2012 | Ma | H04N 21/6125 709/23 |
| 2013/0083926 A1 ‡ | 4/2013 | Hughes | H04L 9/08 380/27 |
| 2013/0101119 A1 ‡ | 4/2013 | Nordholt | H04L 9/0852 380/25 |
| 2013/0138875 A1 | 5/2013 | Kamphenkel | |
| 2013/0142336 A1 | 6/2013 | Fries | |
| 2013/0159704 A1 | 6/2013 | Chandrasekaran | |
| 2013/0208894 A1 ‡ | 8/2013 | Bovino | H04L 9/0852 380/27 |
| 2013/0219454 A1 | 8/2013 | Hewinson | |
| 2013/0227286 A1 ‡ | 8/2013 | Brisson | H04L 9/3226 713/16 |
| 2013/0246641 A1 ‡ | 9/2013 | Vimpari | H04L 47/10 709/22 |
| 2013/0251145 A1 ‡ | 9/2013 | Lowans | H04L 9/0858 380/44 |

(56) References Cited

U.S. PATENT DOCUMENTS

| | | | |
|---|---|---|---|
| 2013/0259233 A1‡ | 10/2013 | Baba | H04L 9/08 380/277 |
| 2013/0262873 A1 | 10/2013 | Read | |
| 2013/0267204 A1 | 10/2013 | Schultz | |
| 2013/0308506 A1 | 11/2013 | Kim | |
| 2013/0311707 A1 | 11/2013 | Kawamura | |
| 2013/0315395 A1‡ | 11/2013 | Jacobs | H04L 9/0852 380/27 |
| 2014/0068765 A1‡ | 3/2014 | Choi | H04L 63/1416 726/23 |
| 2014/0104137 A1 | 4/2014 | Brown | |
| 2014/0141725 A1‡ | 5/2014 | Jesme | H04W 4/80 455/66 |
| 2014/0173713 A1 | 6/2014 | Zheng | |
| 2014/0237565 A1‡ | 8/2014 | Fleysher | H04L 63/083 726/6 |
| 2014/0259138 A1‡ | 9/2014 | Fu | H04L 63/083 726/7 |
| 2014/0281500 A1 | 9/2014 | Ignatchenko | |
| 2014/0281511 A1‡ | 9/2014 | Kaushik | H04L 63/062 713/16 |
| 2014/0281548 A1 | 9/2014 | Boyer | |
| 2014/0331050 A1‡ | 11/2014 | Armstrong | H04L 9/0819 713/17 |
| 2014/0351915 A1‡ | 11/2014 | Otranen | H04L 67/42 726/8 |
| 2015/0046709 A1‡ | 2/2015 | Anspach | H04L 63/0428 713/16 |
| 2015/0062904 A1 | 3/2015 | Sanga | |
| 2015/0074337 A1 | 3/2015 | Jo | |
| 2015/0089624 A1 | 3/2015 | Kim | |
| 2015/0095987 A1‡ | 4/2015 | Potash | H04L 63/08 726/4 |
| 2015/0134727 A1 | 5/2015 | Lee | |
| 2015/0134947 A1‡ | 5/2015 | Varcoe | H04L 9/0858 713/150 |
| 2015/0181308 A1‡ | 6/2015 | Ducharme | H04N 21/44055 380/21 |
| 2015/0193338 A1 | 7/2015 | Sundaram | |
| 2015/0207926 A1‡ | 7/2015 | Brown | H04M 1/72566 455/41 |
| 2015/0222619 A1‡ | 8/2015 | Hughes | H04L 9/0852 713/16 |
| 2015/0236852 A1‡ | 8/2015 | Tanizawa | H04L 9/0858 380/27 |
| 2015/0263855 A1 | 9/2015 | Schulz | |
| 2015/0270963 A1 | 9/2015 | Tanizawa | |
| 2015/0271147 A1‡ | 9/2015 | Tanizawa | H04L 9/0852 713/17 |
| 2015/0288517 A1‡ | 10/2015 | Evans | H04L 9/12 713/16 |
| 2015/0288542 A1‡ | 10/2015 | Ashrafi | H04B 10/2581 375/26 |
| 2015/0309924 A1‡ | 10/2015 | Chen | G06F 13/385 711/10 |
| 2015/0317469 A1‡ | 11/2015 | Liu | H04L 9/3226 726/19 |
| 2015/0325242 A1‡ | 11/2015 | Lu | H04L 63/08 704/24 |
| 2015/0326613 A1‡ | 11/2015 | Devarajan | H04L 61/2007 726/1 |
| 2015/0350181 A1‡ | 12/2015 | Call | H04L 63/1466 726/6 |
| 2015/0379261 A1‡ | 12/2015 | Daigle | H04W 12/0608 726/6 |
| 2015/0381363 A1‡ | 12/2015 | Teixeira | H04L 9/0869 380/45 |
| 2016/0013937 A1* | 1/2016 | Choi | H04L 9/0852 380/278 |
| 2016/0021068 A1‡ | 1/2016 | Jueneman | H04L 9/0877 713/16 |
| 2016/0080708 A1‡ | 3/2016 | Urata | H04W 4/80 348/74 |
| 2016/0087946 A1‡ | 3/2016 | Yang | H04L 63/0428 713/17 |
| 2016/0087950 A1 | 3/2016 | Barbir | |
| 2016/0105439 A1‡ | 4/2016 | Hunt | H04B 10/70 726/4 |
| 2016/0127127 A1 | 5/2016 | Zhao | |
| 2016/0149700 A1‡ | 5/2016 | Fu | H04L 9/0852 380/278 |
| 2016/0210105 A1‡ | 7/2016 | Ru | H04L 67/16 |
| 2016/0226846 A1‡ | 8/2016 | Fu | H04L 9/0852 |
| 2016/0241396 A1‡ | 8/2016 | Fu | H04L 9/0852 |
| 2016/0248581 A1‡ | 8/2016 | Fu | H04L 9/0855 |
| 2016/0283116 A1 | 9/2016 | Ramalingam | |
| 2016/0283125 A1 | 9/2016 | Hashimoto | |
| 2016/0294783 A1‡ | 10/2016 | Piqueras Jover | H04W 12/04 |
| 2016/0300073 A1* | 10/2016 | Pomeroy | H04L 9/0891 |
| 2016/0306552 A1 | 10/2016 | Liu | |
| 2016/0313943 A1 | 10/2016 | Hashimoto | |
| 2016/0337329 A1‡ | 11/2016 | Sood | H04L 9/30 |
| 2016/0357452 A1 | 12/2016 | Kadam | |
| 2016/0359626 A1 | 12/2016 | Fu | |
| 2016/0359839 A1‡ | 12/2016 | Natividad | H04W 12/06 |
| 2016/0366713 A1 | 12/2016 | Sonnino | |
| 2017/0034167 A1‡ | 2/2017 | Figueira | H04L 63/0428 |
| 2017/0104588 A1 | 4/2017 | Camenisch | |
| 2017/0214525 A1 | 7/2017 | Zhao | |
| 2017/0230173 A1‡ | 8/2017 | Choi | H04L 9/0891 |
| 2017/0237558 A1 | 8/2017 | Yuan | |
| 2017/0237559 A1 | 8/2017 | Yuan | |
| 2017/0302448 A1‡ | 10/2017 | Luk | H04L 9/0643 |
| 2017/0324730 A1‡ | 11/2017 | Otranen | H04L 9/3271 |
| 2017/0371585 A1 | 12/2017 | Lazo | |
| 2018/0048466 A1‡ | 2/2018 | Chen | H04L 9/32 |
| 2018/0063709 A1‡ | 3/2018 | Morrison | H04L 9/3239 |
| 2018/0077449 A1 | 3/2018 | Herz | |
| 2018/0262907 A1 | 9/2018 | Alanis | |
| 2018/0351734 A1‡ | 12/2018 | Zhao | H04L 29/06 |
| 2019/0103962 A1 | 4/2019 | Howe | |
| 2019/0179751 A1 | 6/2019 | Kanno | |
| 2019/0391756 A1 | 12/2019 | Wang | |
| 2020/0201570 A1 | 6/2020 | Kim | |

FOREIGN PATENT DOCUMENTS

| | | |
|---|---|---|
| EP | 0962070 | ‡ 12/1999 |
| EP | 2385690 | 11/2011 |
| EP | 3007478 | 4/2016 |
| WO | 2012098543 | ‡ 7/2012 |
| WO | 2013026086 | ‡ 2/2013 |
| WO | 2016070141 | ‡ 5/2016 |

OTHER PUBLICATIONS

Richard J Hughes et al. "Practical free-space quantum key distribution over 10 km in daylight and at night", New Journal of Physics 2002.‡

Mark Hillery et al. "Quantum Secret Sharing", American Physical Society 1999.‡

Juan-Ignacio Cirac, Nicolas Gisin "Coherent eavesdropping strategies for the four state quantum cryptography protocol" Physics Letters A, vol. 229(1), pp. 1-7 (1997).

Tien-Sheng Lin, et al., Quantulm Aulthentication and Secure Communication Protocols, 2006 IEEE (Year:2006).

Charles H. Bennett et al., Quantum cryptography: Public key distribution and coin tossing, www.elsevier.com/locate/tcx, 2014 (Year: 2014).

R. Alleaume et al., Using Quantum key distribution for cryptographic purposes: A survey, www.elsevier.com/locate/tcs, 2009 (Year:2009).

Toung-Shang Wei et al., Comment on "Quantum Key Distribution and Quantum Authentication Based on Entangled State", Springer, 2011 (Year: 2011).

(56) References Cited

OTHER PUBLICATIONS

Ivan Damgard et al., Secure Identification and QKD in the bounded-quantum-storage model, www.elsevier.com/locate/tcs, 2009 (Year: 2009).
Valerio Scarani et al., The black paper of quantum cryptography: Real implementation problems, www.elsevier.com/locate/tcs, 2014.
Jung-Lun Hsu et al., Dynamic quantum secret sharing, Springer, 2012.
Ci-Hong Liao et al., Dynamic quantum secret sharing protocol based on GHZ state, Springer, 2014.
Xugang Ren et al., A Novel Dynamic User Authentication Scheme, 2012 International Symposium on Communications and Information Technologies, 2012.
Phyllis A. Schneck et al., Dynamic Authentication for High-Performance Networked Applications, 1998 IEEE.
Lanjun Dang, An Improved Mutual Authentication Scheme for Smart Card Secure Messaging, Proceedings of the IEEE International Conference on E-Commerce Technology for Dynamic E-Business (CEC-East'04), 2004.
Wenjie Liu, et al., Authenticated Quantum Secure Direct Communication with Qutrits, Fourth International Conference on Natural Computation, IEEE 2008.
Baker et al. "Recommendation for Key Management—Part 1: General (Revision 3)", NIST Special Publication 800-57, Jul. 2012 (Year:2012).
Sufyan T. Faraj, "A Novel Extension of SSL/TLS Based on Quantum Key Distribution", Computer and Communication Engineering , 2008. ICCCE 2008. International Conference on, IEEE, Piscataway, NJ, USA, May 16, 2008, pp. 919-922.
Kim et al. "A space-Efficient Flash Translation layer for CompactFlash Systems." May 2002. IEEE. IEEE Transactions on Consumer Electronics. vol. 48. pp. 366-375.
Kang et al. "The Multi-Streamed Solid-State Drive." Jun. 2014. USENIX. Hotstorage '14.
Bhimani et al. "FIOS: Feature Based I/O Stream Identification for Improving Endurance of Multi-Stream SSDs" Jul. 2018. IEEE. 11th International Conference on Cloud Computing. pp. 17-24.

\* cited by examiner
‡ imported from a related application

SYSTEM AND METHOD FOR ENCRYPTION AND DECRYPTION BASED ON QUANTUM KEY DISTRIBUTION

RELATED APPLICATION

This application is a continuation of U.S. application Ser. No. 15/481,338, entitled "SYSTEM AND METHOD FOR ENCRYPTION AND DECRYPTION BASED ON QUANTUM KEY DISTRIBUTION," by inventors Peng Yuan and Zhiqiang Wang, filed 6 Apr. 2017 (hereinafter "the '338 application"), the disclosure of which is incorporated by reference herein. Under 35 U.S.C. 119, the '338 application claims the benefit and right of priority of Chinese Patent Application No. 2016/10298847.1, filed 6 May 2016.

BACKGROUND

Field

This disclosure is generally related to the field of data encryption. More specifically, this disclosure is related to a method and system for encryption and decryption based on quantum key distribution.

Related Art

The proliferation of the Internet and e-commerce continues to create a vast amount and types of digital content. Sensitive data, such as company data and customer data, may be vulnerable to security leaks. One solution to protect such sensitive data is based on data storage encryption technology, which generally involves applying a specific technology to encrypt data before writing the data onto a storage device, and to subsequently decrypt the data when reading the stored data.

Features of a typical data storage encryption system may include, e.g., host software encryption, an encrypted storage security switch, an embedded special encryption device, and an encryption mechanism based on the storage device itself. A typical logical architecture for such features may include an encryption/decryption unit and a key management center. The encryption/decryption unit can encrypt data to be stored using a key (which is typically fixed or infrequently updated), and can also decrypt stored data with the fixed key. The key management center can store the fixed key, and can also perform other key management-related functions, such as selecting new keys and deleting unused or previously used keys.

Replacing or updating a fixed ("original") key may occur only under specific circumstances, e.g., when establishing a secure transmission channel based on an asymmetric encryption algorithm via the key management center and transmitting the new key to the encryption/decryption unit, or by a specific administrative user who physically visits the actual site to manually update the key, e.g., by copying a new key to the system. In addition, when replacing or updating a key, the system must retain access to both the original key and the original encrypted data in order to retain the ability to decrypt the original encrypted data.

However, this typical data storage encryption system may result in several problems. First, because of the fixed key, the stored encrypted data may be vulnerable to a brute force attack. If the fixed key is discovered, all of the stored data encrypted based on that fixed key may face the risk of exposure. Second, the key distribution process (e.g., selecting or replacing a key) may pose a security risk. For example, adopting an asymmetric encryption algorithm for a key distribution process requires transmissions between two entities. These transmissions may be susceptible to eavesdropping and algorithm hacking. Furthermore, a manual update may face the risk of malicious disclosure. Third, in order for the system to retain access to the original key and the original encrypted data upon updating a key, the system may require administrative users (e.g., management and maintenance personnel) to perform additional and potentially computationally complex work to handle the original key and the original encrypted data. These problems may decrease the efficiency and security of the data storage encryption system.

SUMMARY

One embodiment of the present invention provides a system for facilitating storage encryption and decryption. During operation, the system receives a first request to encrypt data, wherein the first request indicates the data to be encrypted. The system encrypts the data based on a key, and determines a key label for the key. The system transmits the encrypted data and the key label to a remote device, thereby facilitating secure encryption and decryption of data on the remote device.

In some embodiments, the system updates the key based on a dynamic key refreshment protocol by performing several operations. The system obtains a first new key from a first key pool. The system transmits a first synchronization request to a key-managing device, which causes the key-managing device to obtain from a second key pool of the key-managing device a second new key which is the same as the first new key. The system obtains a first new key label for the first new key, wherein the first new key label is the same as a second new key label obtained for the second new key, wherein the first new key is the key used to encrypt the data, and wherein the first new key label is the determined key label.

In some embodiments, the dynamic key refreshment protocol is based on one or more of: determining that a predetermined time interval has passed; and receiving the first request.

In some embodiments, the first new key and the second new key are obtained based on a same method, and the first new key label and the second new key label are obtained based on a same algorithm.

In some embodiments, the system computes a first hash value of the first new key. The system includes the first hash value in the first synchronization request, which allows the key-managing device to verify the second new key by confirming that a second hash value of the second new key is the same as the first hash value.

In some embodiments, a quantum engine of the computer system generates one or more key sequences based on a quantum communication with a quantum engine of a key-managing device. The computer system stores the generated key sequences in a first key pool of the computer system. The key-managing device stores the generated key sequences in a second key pool of the key-managing device. The computer system generates a first key label for a respective key sequence in the first key pool. The key-managing device generates a second key label for a respective key sequence in the second key pool, wherein the first key label and the second key label are generated based on a same algorithm.

In some embodiments, the system receives a second request to decrypt the encrypted data, wherein the second request indicates the encrypted data and the key label. The system transmits a third request for the updated key, wherein the third request includes the key label. The system receives the updated key, and decrypts the encrypted data based on the received updated key.

In some embodiments, the third request is transmitted to a key-managing device, and the updated key is received from the key-managing device. Prior to transmitting the third request to the key-managing device, the system obtains obtaining a third key from the first key pool, and transmits a second synchronization request to the key-managing device, which causes the key-managing device to obtain from a second key pool of the key-managing device a fourth key which is the same as the third key. The system encrypts, based on the third key, the key label included in the third request, wherein the received updated key is encrypted based on the fourth key. The system decrypts, based on the third key, the encrypted received updated key.

Another embodiment of the present invention provides a system for facilitating storage encryption and decryption. During operation, the system receives, based on a dynamic key refreshment protocol, a first synchronization request which indicates a first key obtained from a first key pool. The system obtains a second key from a second key pool, wherein the second key is the same as the first key. The system obtains a second key label for the second key, wherein the second key label is the same as a first key label obtained for the first key. The system stores the second key and the second key label, thereby facilitating secure encryption and decryption of data on a remote device.

In some embodiments, the first synchronization request includes a first hash value of the first key. The system computes a second hash value of the second key. The system verifies the second key by confirming that the second hash value is the same as the first hash value.

In some embodiments, the second key and the second key label are stored in a database associated with the computing system. The system receives a request for the second key, wherein the request includes the second key label. The system retrieves the second key from the database based on the second key label included in the request for the second key. The system returns the retrieved second key.

In some embodiments, the request is received from a security device, and the retrieved second key is returned to the security device. Prior to receiving the request from the security device: the system receives, from the security device, a second synchronization request associated with a third key from the first key pool, wherein the second key label included in the request for the second key is encrypted based on the third key; the system obtains, from the second key pool, a fourth key which is the same as the third key; and the system decrypts the encrypted second key label based on the fourth key. Prior to returning the retrieved second key, the system encrypts the retrieved second key based on the fourth key.

BRIEF DESCRIPTION OF THE FIGURES

In the figures, like reference numerals refer to the same figure elements.

DETAILED DESCRIPTION

Figure 1:
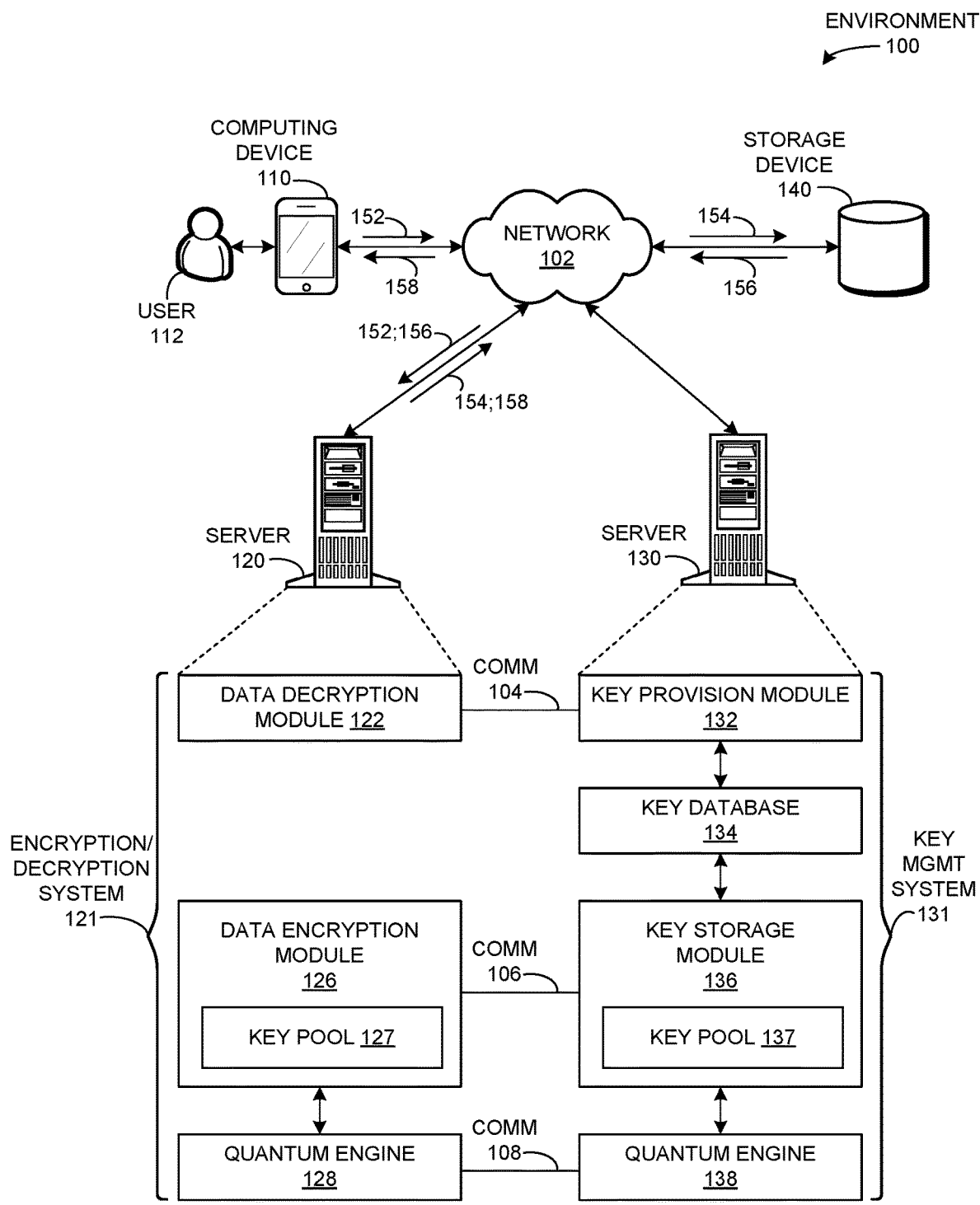
FIG. 1 illustrates an exemplary environment that facilitates storage encryption and decryption, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of security-related deficiencies in a data storage encryption system by applying a quantum key distribution protocol to generate keys, and by storing a corresponding key label for a generated key. In a typical data storage encryption system, an encryption/decryption unit (a "security device") and a key management center (a "key-managing device") may share a fixed ("original") key with which to encrypt data to be stored and to decrypt the stored data ("original data"). Replacing or updating such a fixed key may require the system to retain access to both the original key and the original encrypted data. This may result in several deficiencies. First, because of the fixed key, the stored encrypted data may be vulnerable to a brute force attack. If the fixed key is discovered, all of the stored data encrypted based on that fixed key may face the risk of exposure. Second, the key distribution process (e.g., selecting or updating a key) may pose a security risk. For example, adopting an asymmetric encryption algorithm for a key distribution process requires transmissions between two entities. These transmissions may be susceptible to eavesdropping and algorithm hacking.

Furthermore, a manual update may face the risk of malicious disclosure. Third, in order for the system to retain access to the original key and the original encrypted data upon updating a key, the system may require administrative users (e.g., management and maintenance personnel) to perform additional and potentially computationally complex work to handle the original key and the original encrypted data. These problems may decrease the efficiency and security of the data storage encryption system Embodiments of the present invention address these issues by applying a quantum key distribution technology to generate and distribute keys, selecting a new key periodically or continuously (i.e., updating the key), and storing a corresponding key label for an updated key. Specifically, upon receiving a request to encrypt data to be stored on a storage device, the system updates a key based on a dynamic key refreshment protocol, such as periodically (based on a certain time interval) or continuously (based on a "one storage per key" method). The system determines a key label for the selected key, encrypts the data using the selected key, and returns both the encrypted data and the corresponding key label for storage in the storage device.

A key-managing device and a security device can generate the same pools of keys (i.e., the same key sequences in each respective key pool) by communicating via a quantum channel or a quantum key distribution protocol. Such a protocol is based on the principle of quantum mechanics, which guarantees the security of the key distribution process, as described herein. Communication via such a protocol further allows the key-managing device and the security device to coordinate and synchronize the selection of the same key and the corresponding key label. Furthermore, by updating the key based on a dynamic key refreshment protocol (i.e., periodically or continuously) instead of using a fixed key, the system may flexibly encrypt data using different keys, which increases the security of the data storage. In addition, the key-managing device and the security device can determine a same corresponding key label for an updated key, which label can be subsequently used to retrieve the updated key and correctly decrypt the stored data. By using a corresponding key label to access each updated key, different keys may be used to encrypt the data to be stored. This allows an increased diversity in the granularity of the key usage, which can both increase the security of the data storage and simplify the process of replacing or updating the key.

Thus, the present system provides improvements to data storage encryption technology, where the improvements are fundamentally technological. Embodiments of the present invention provide a technological solution (e.g., applying a quantum key distribution technology, updating a key based on a dynamic key refreshment protocol, and storing a corresponding key label for the updated key for subsequent decrypting of the data) to the technological problem of secure data storage encryption (as in the above-described risks in a typical data storage encryption system).

The terms "quantum key distribution technology," "quantum key distribution protocol," and "quantum key distribution operation" refer to operations performed by a quantum engine or a quantum device of a first entity (e.g., a key-managing device) and a second entity (e.g., a security device). The first and second entities each generate the same random key sequence after performing standard processing operations, such as original key negotiation, key screening, error correction, and privacy amplification. Upon generating the same random key sequence, the first and second entities may each store the key sequences in a respective key pool.

Exemplary quantum key distribution protocols include the BB84, B91, and B92 protocols, as well as other protocols which have been proposed to improve the code rate, such as continuous variable QKD, DSP-QKP, and SARG. Assume two entities which communicate during a quantum key distribution protocol. The first entity ("Alice") can randomly generate a set of binary data strings, and can select a basic vector based on the data strings to prepare a corresponding encoded quantum state to be sent to the second entity ("Bob") via a quantum channel. Subsequently, Bob can disclose his own basic vector via a classical channel (i.e., an electrical or wired channel which is not a quantum channel), which allows both Alice and Bob to select a key using the same basic vector. As a result, both Alice and Bob can obtain the unconditional secure key sequence by estimating the error rate, error correction, and the privacy amplification, and by performing other processing operations.

The term "key sequence" refers to a sequence consisting of a number of key bits. The term "key pool" refers to a memory area which stores key sequences generated upon performing a quantum key distribution operation.

The term "key label" refers to an identifier or identifying information used to distinguish between different keys. The key label may be in the form of, e.g., numerical values or character strings.

The term "synchronization request" refers to a request sent by a security device to a key-managing device, which request triggers the key-managing device to obtain a key from its key pool which is the same as a key from the key pool of the security device.

Exemplary System

FIG. 1 illustrates an exemplary environment 100 that facilitates storage encryption and decryption, in accordance with an embodiment of the present application. Environment 100 can include a computing device 110 which is associated with a user 112. Computing device 110 can include, for example, a tablet, a mobile phone, an electronic reader, a laptop computer, a desktop computer, or any other computing device. Environment 100 can also include a server 120, a server 130, and a storage device 140, which may communicate with each other (and computing device 110) via a network 102. Server 120 may be, e.g., a security device 120 with an encryption/decryption system 121, which includes: a data decryption module 122 which decrypts data based on a key label; a data encryption module 126 which encrypts data and returns the encrypted data and a corresponding key label; a key pool 127 which may be associated with data encryption module 126; and a quantum engine 128 which generates key sequences based on a quantum key distribution protocol or operation. Server 130 may be, e.g., a key-managing device 130 with a key management system 131, which includes: a key provision module 132 which processes requests for keys by querying a key database 134; key database 134 which stores keys and their corresponding key labels; a key storage module 136 which processes requests for synchronized and updated keys from a key pool generated during a quantum key distribution protocol or operation; and a quantum engine 138 which generates key sequences based on a quantum key distribution protocol or operation.

Data decryption module 122 can communicate with key provision module 132 via a communication 104, and data encryption module 126 can communicate with key storage module 136 via a communication 106. Quantum engine 128 can communicate with quantum engine 138 via a communication 108, which can be via a quantum channel as part of a quantum key distribution protocol or operation.

During operation, user 112 may send, via computing device 110, a request 152 to encrypt data which is to be stored on storage device 140. Security device 120 can receive request 152, update a key based on a dynamic key refreshment protocol (e.g., periodically at a certain time interval or continuously for each new request), obtain a key label for the updated key, encrypt the data using the updated key, and send a packet 154 to storage device 140, where packet 154 can indicate the encrypted data and the corresponding key label. These operations are described in detail below in relation to FIG. 2.

Subsequently, an application or function which can interface with storage device 140 may send a request (not shown) to decrypt the encrypted data stored on storage device 140. This may trigger storage device 140 to send a packet 156 to security device 120, where packet 156 can indicate the encrypted data and the corresponding key label (similar to packet 154). Security device 120 can receive a request to decrypt data based on received packet 156, obtain a key based on the key label included in packet 156, decrypt the data using the obtained key, and send a packet 158 back to the interfacing application or function, e.g., computing device 110 associated with user 112, wherein packet 158 can indicate the decrypted data. These operations are described in detail below in relation to FIG. 2.

Figure 2:
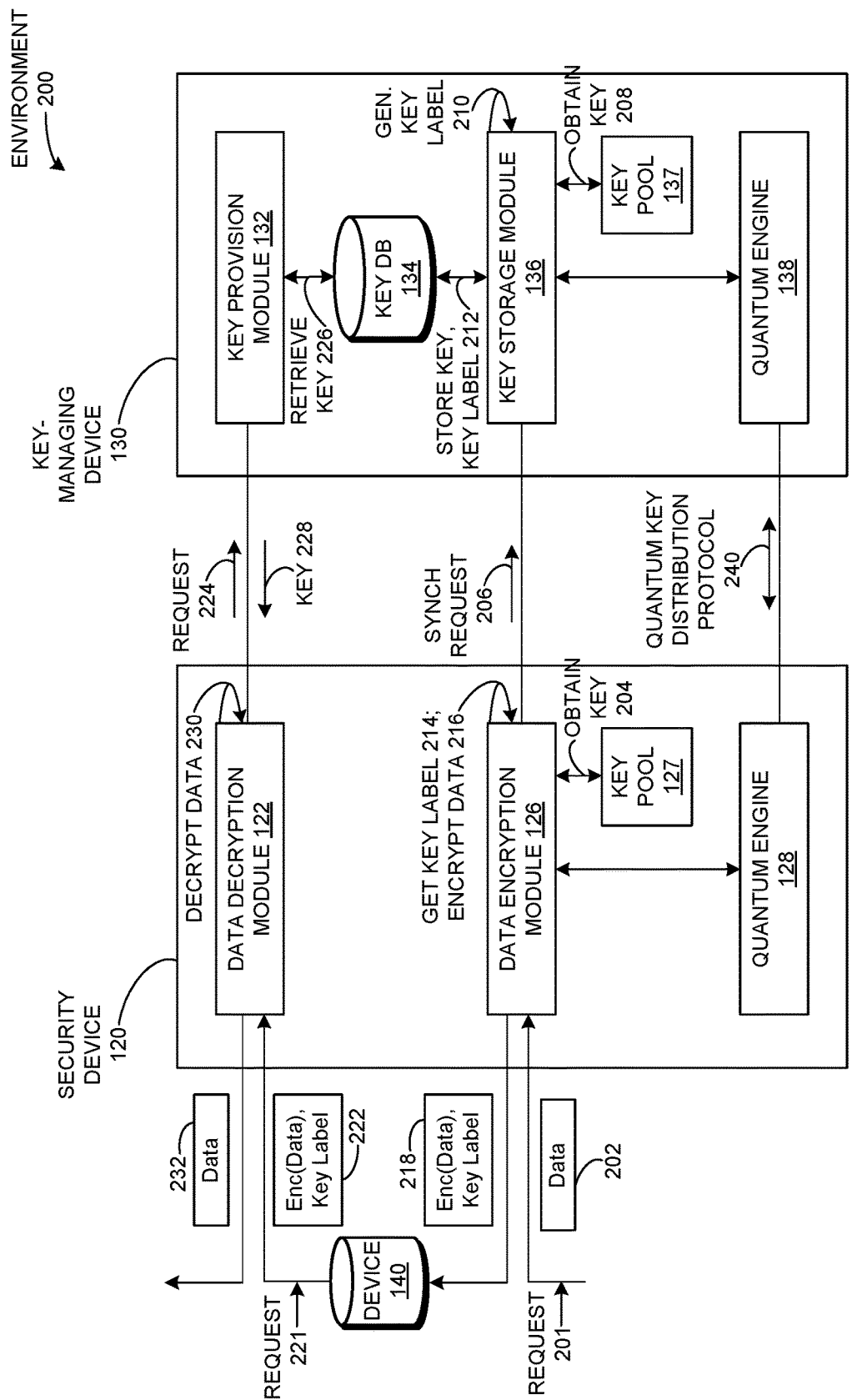
FIG. 2 illustrates an exemplary environment that facilitates storage encryption and decryption, including exemplary communications, in accordance with an embodiment of the present application.

FIG. 2 illustrates an exemplary environment 200 that facilitates storage encryption and decryption, including exemplary communications, in accordance with an embodiment of the present application. Environment 200 can include security device 120, key-managing device 130, and storage device 140, as in environment 100 of FIG. 1. While environment 200 depicts various modules as residing inside each of security device 120 and key-managing device 130, in some embodiments, one or more of these modules may reside within a single system or entity. During operation, quantum engine 128 and quantum engine 138 can perform a quantum key distribution protocol 240, which generates the same key sequences and stores the generated key sequences in, respectively, key pool 127 and key pool 137. Subsequently, data encryption module 126 can receive a request 201 to encrypt data 202 which is to be stored on storage device 140. Request 201 can indicate data of a packet 202. Prior to indicating data 202 in request 201, the system can perform fractionation, compression, and other data processing on data 202. A functional unit may trigger data encryption module 126 to encrypt data 202 via an application programming interface (API) or by transmitting a message (such as request 201).

Data encryption module 126 can update a key based on a dynamic key refreshment protocol. For example, when the dynamic key refreshment protocol is based on the passage of a certain time period or interval, or based on simply receiving a new request (e.g., request 201), data encryption module may proceed with updating the key by obtaining a new key via a synchronization request, as described below. When the dynamic key refreshment protocol determines that the key is not to be updated (e.g., a certain time interval has not yet passed), the system may use a key which has been most recently used for an encryption operation. In some embodiments, request 201 may include an instruction to update the key, and data encryption module 126 or any other module may process such an included instructions.

Data encryption module 126 can obtain a key from key pool 127 (function 204), and send a synchronization request 206 to key storage module 136. Synchronization request 206 can indicate that key storage module 136 is to obtain a key from key pool 137 which is the same as the key obtained by data encryption module 126. That is, upon receiving synchronization request 206, key storage module 136 can obtain a key from key pool 137 (function 208), where the obtained key is the same as the key obtained by data encryption module 126 from key pool 127 (as in function 204). Functions 204 and 208 may be based on applying the same predetermined method to obtain the same key from the respective key pool. For example, the key may be obtained by a method which is based on information such as a key selection position and a key length, which may be indicated or carried in synchronization request 206. Any method may be used to obtain the key, as long as the same key is obtained in function 208 as in function 204.

Key storage module 136 can generate a key label (function 210) for the obtained key, and send both the obtained key and the generated key label to key database 134 (function 212). Data encryption module 126 can also obtain or generate the key label for the obtained key (function 214). Functions 210 and 214 may be based on applying the same predetermined algorithm to generate the key label, or based on a communication between security device 120 and key-managing device 130 regarding the same predetermined algorithm. For example, in applying the same algorithm, a counter may be used to generate the key label for the key. The initial value of the counter may be set to a value of zero, and the counter value may be increased by one for each key replacement. After a key replacement and corresponding increase to the counter value, the counter value may be indicated in the key label. Both security device 120 and key-managing device 130 may use this same algorithm to ensure the generation of the same key label. As another example, the security device may generate the key label, and subsequently send the generated key label to the key-managing device so that the key-managing device has the same generated key label for the key. Alternatively, the key-managing device may generate the key label, and subsequently send the generated key label to the security device so that the security device has the same generated key label for the key.

Data encryption module 126 may encrypt the data (function 216) based on the obtained key, and send both the encrypted data and the corresponding key label (packet 218) to storage device 140. The system can use a symmetric encryption algorithm, e.g., RC2, RC4, Data Encryption Standard (DES), 3DES, or Advanced Encryption Standard (AES).

Subsequently, data decryption module 122 can receive a request 221 to decrypt data of a packet 222, which indicates the encrypted data and the corresponding key label, as previously stored on storage device 140. Request 221 may be received from, e.g., a functional unit with an access interface to storage device 140, as described above in relation to request 201. Data decryption module 122 can send a request 224 to key provision module 132. Request 224 can include the key label, and can further indicate a request for the key corresponding to the included key label. Key provision module 132 can receive request 224 and retrieve the requested key from key database 134 based on the corresponding key label (function 226). Recall that the key and the corresponding key label are previously both stored in key database 134. Key provision module 132 can send the retrieved key 228 to data decryption module 122, which can decrypt the data based on the retrieved key (function 230) and transmit the decrypted data (packet 232) back to, e.g., a requesting application.

Thus, environment 200 depicts a system which facilitates secure encryption and decryption of data on a remote device (e.g., a storage device) by updating a key based on a dynamic key refreshment protocol, storing a key label for the updated key, and applying a quantum key distribution protocol to ensure the synchronization and security of key distribution. The system allows a new key to be selected (e.g., updating a key) on a periodic basis (e.g., based on a predetermined time interval) or on a continuous basis (e.g., based on receiving a request to encrypt data, that is, a "one key one storage" method).

Method for Facilitating Data Storage Encryption by a Security Device

Figure 3A:
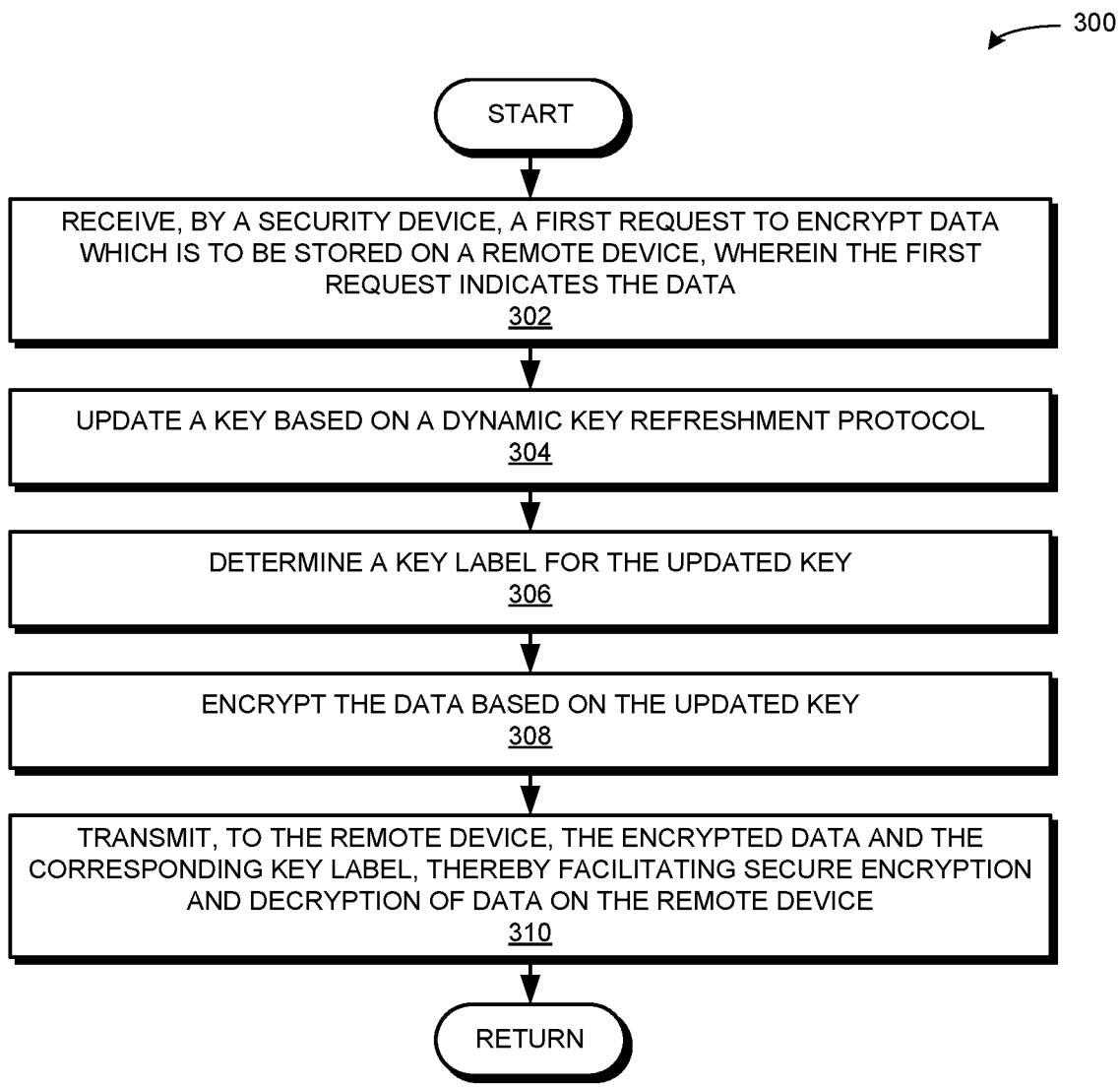
FIG. 3A presents a flowchart illustrating a method by a security device for encrypting data to be stored on a storage device, in accordance with an embodiment of the present application.

FIG. 3A presents a flowchart 300 illustrating a method by a security device for encrypting data to be stored on a storage device, in accordance with an embodiment of the present application. During operation, the system receives, by a security device, a first request to encrypt data which is to be stored on a remote device, wherein the first request indicates the data (operation 302). The system updates the key based on a dynamic key refreshment protocol (operation 304). The system determines a key label for the updated key (operation 306). The system encrypts the data based on the updated key (operation 308). The system transmits the encrypted data and the key label to the remote device, thereby facilitating secure encryption and decryption of data on the remote device (operation 310).

Figure 3B:
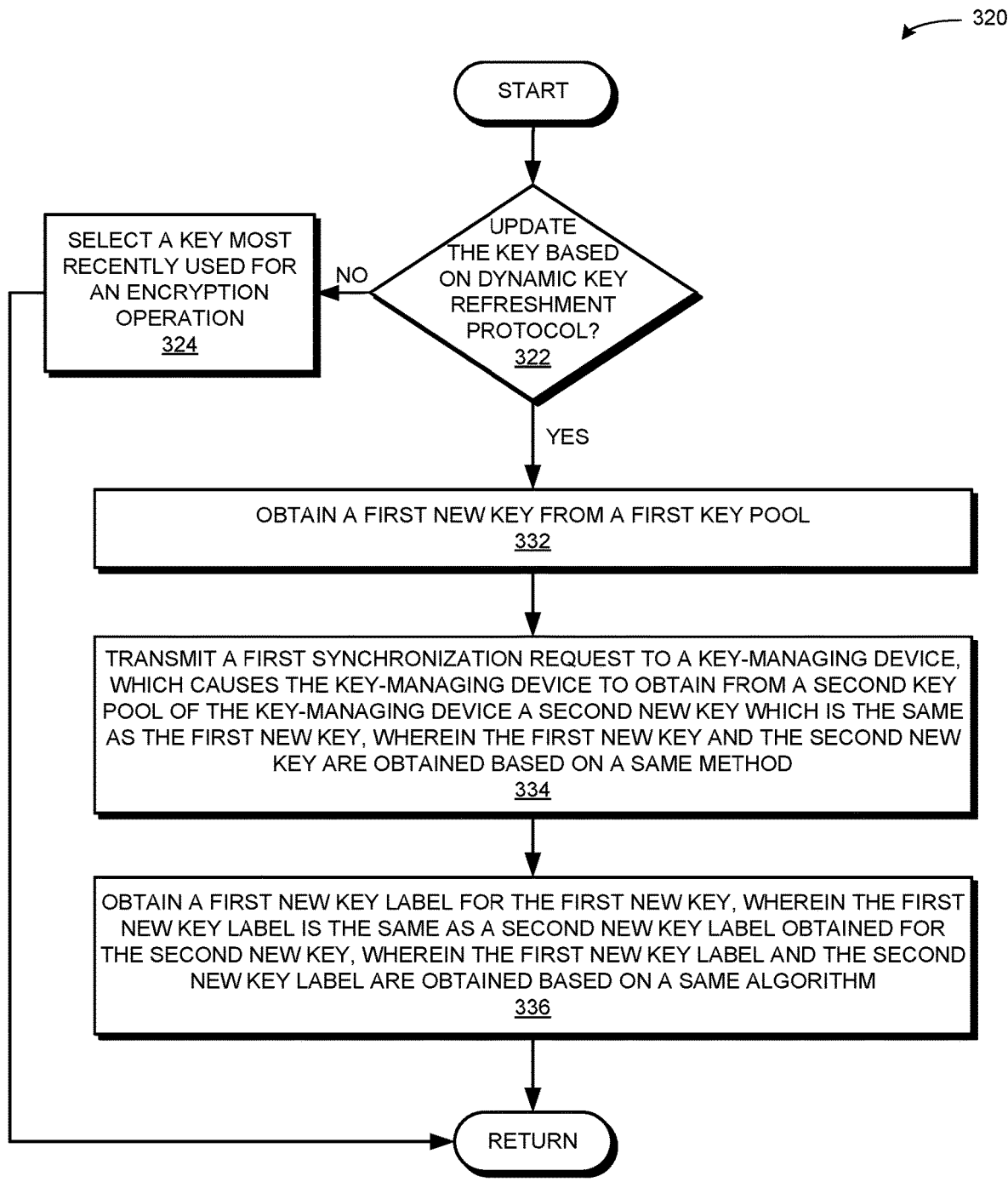
FIG. 3B presents a flowchart illustrating a method by a security device for updating a key, in accordance with an embodiment of the present application.

FIG. 3B presents a flowchart 320 illustrating a method by a security device for updating a key, in accordance with an embodiment of the present application. During operation, the system determines whether to update the key based on a dynamic key refreshment protocol (decision 322). If the system determines not to update the key (decision 322), the system selects a key most recently used for an encryption operation (operation 324), and the operation returns. If the system determines to update the key based on a dynamic key refreshment protocol (decision 322), the system obtains a first new key from a first key pool (operation 332). The first key pool may be associated with the security device. The system transmits a first synchronization request to a key-managing device, which causes the key-managing device to obtain from a second key pool of the key-managing device a second new key which is the same as the first new key, wherein the first new key and the second new key are obtained based on a same method (operation 334). The system obtains a first new key label for the first new key, wherein the first new key label is the same as a second new key label obtained for the second new key, wherein the first new key label and the second new key label are obtained based on a same algorithm (operation 336). Upon updating the key, the system may also delete both the key most recently used for an encryption operation, and the corresponding key label. This reduces the amount of storage space required, and also decreases the risk of key exposure by allowing the key-managing device to maintain centralized management.

In some embodiments, the system may compute a hash of the first new key, and include the computed hash value in the first synchronization request, which allows the key-managing device to verify the second new key by confirming that a second hash value of the second new key is the same as the first hash value. If the first and second hash values do not match, the security device and the key-managing device may re-select the key via another exchange or negotiation.

Figure 3C:
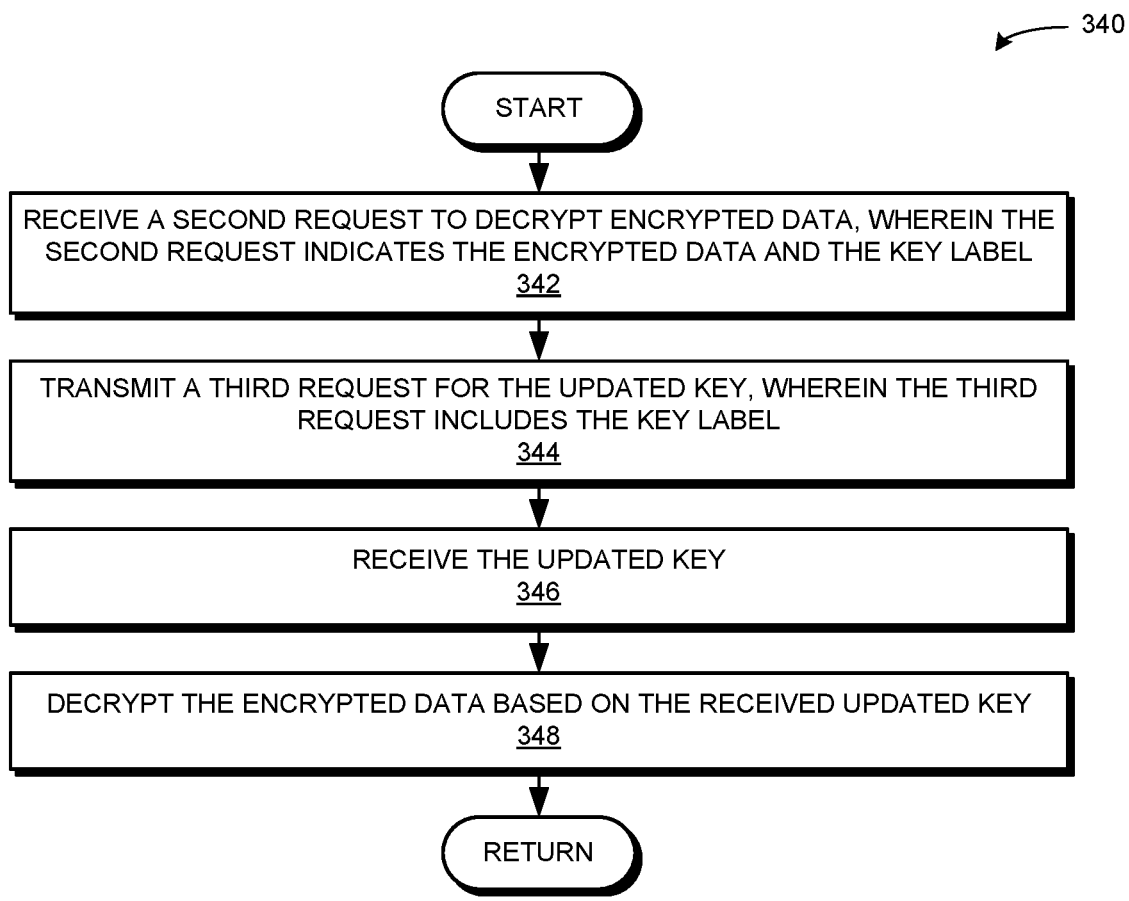
FIG. 3C presents a flowchart illustrating a method by a security device for decrypting data stored on a storage device, in accordance with an embodiment of the present application.

FIG. 3C presents a flowchart 340 illustrating a method by a security device for decrypting data stored on a storage device, in accordance with an embodiment of the present application. During operation, the system receives a second request to decrypt encrypted data, wherein the second request indicates the encrypted data and the key label (operation 342). The system transmits a third request for the updated key, wherein the third request includes the key label (operation 344). The system receives the updated key (operation 346), and decrypts the encrypted data based on the received updated key (operation 348).

To protect the security of the key label included in the third request, the system can encrypt the key label using another key ("third key") and based on a symmetric encryption algorithm (as described above) and included the encrypted key label in the third request. Specifically, the system can obtain this third key from the first key pool (of the system or security device), and transmit a second synchronization request to the key-managing device, which causes the key-managing device to obtain from the second key pool (of the key-managing device) a fourth key which is the same as the third key. The system can then encrypt, based on the third key, the key label included in the third request (as part of operation 344). The key-managing device can decrypt the encrypted key label based on the fourth key, and also encrypt the received updated key based on the fourth key (as part of operation 346). Finally, the system can decrypt the encrypted received updated key based on the third key.

Generating Keys Based on a Quantum Key Distribution Protocol

Figure 4:
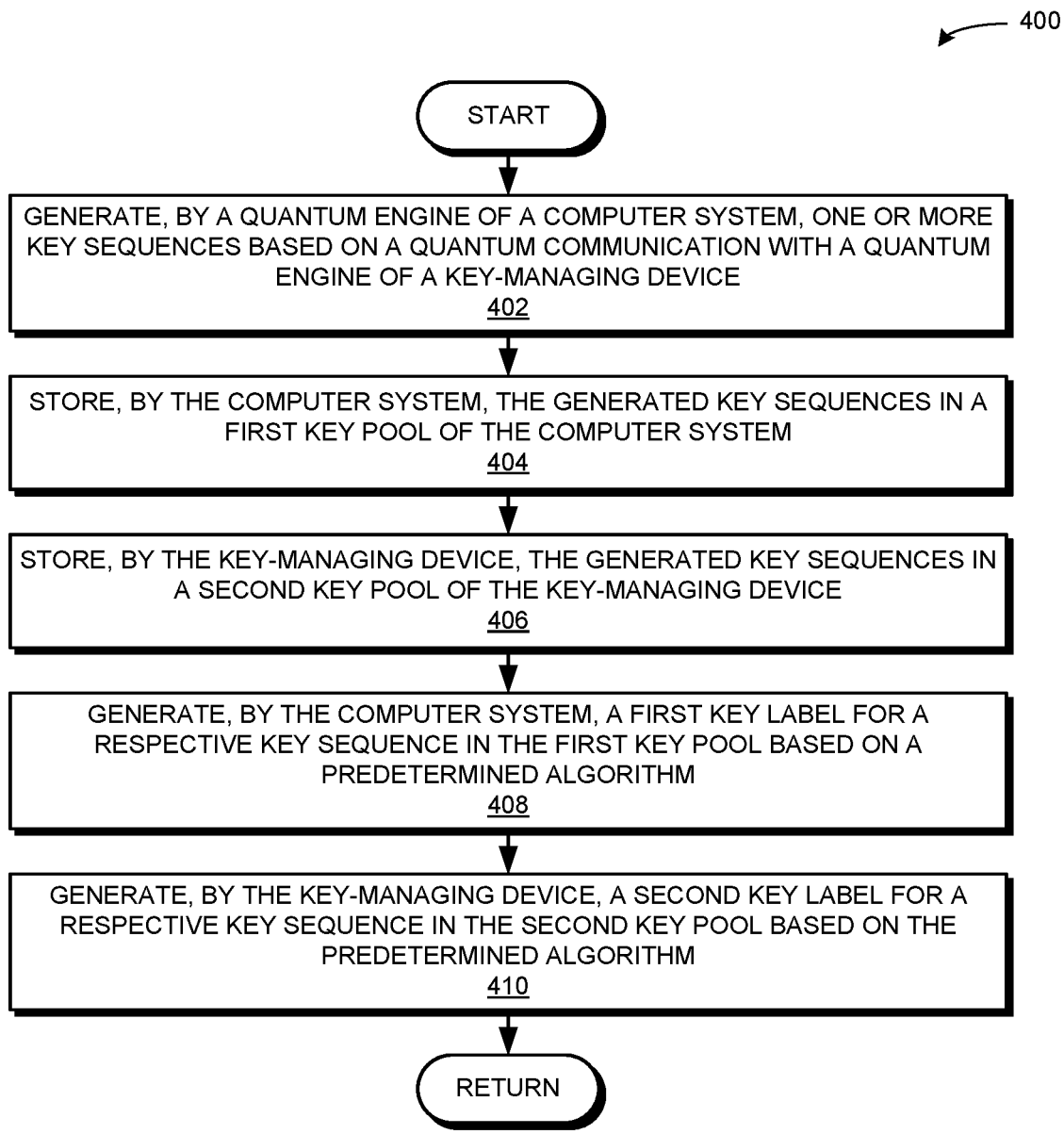
FIG. 4 presents a flowchart illustrating a method for generating keys based on a quantum key distribution protocol, in accordance with an embodiment of the present application.

FIG. 4 presents a flowchart 400 illustrating a method for generating keys based on a quantum key distribution protocol, in accordance with an embodiment of the present application. During operation, a quantum engine of a computer system (e.g., a security device) generates one or more key sequences based on a quantum communication with a quantum engine of a key-managing device (operation 402). The two quantum engines may communicate as part of a quantum key distribution protocol, via a quantum channel. The advantages of such a protocol are described above. The computer system stores the generated key sequences in a first key pool of the computer system (operation 404). The key-managing device stores the generated key sequences in a second key pool of the key-managing device (operation 406). The computer system generates a first key label for a respective key sequence in the first key pool based a predetermined algorithm (operation 408). The key-managing device generates a second key label for a respective key sequence in the second key pool based on the (same) predetermined algorithm (operation 410).

Method for Facilitating Data Storage Encryption by a Key-Managing Device

Figure 5A:
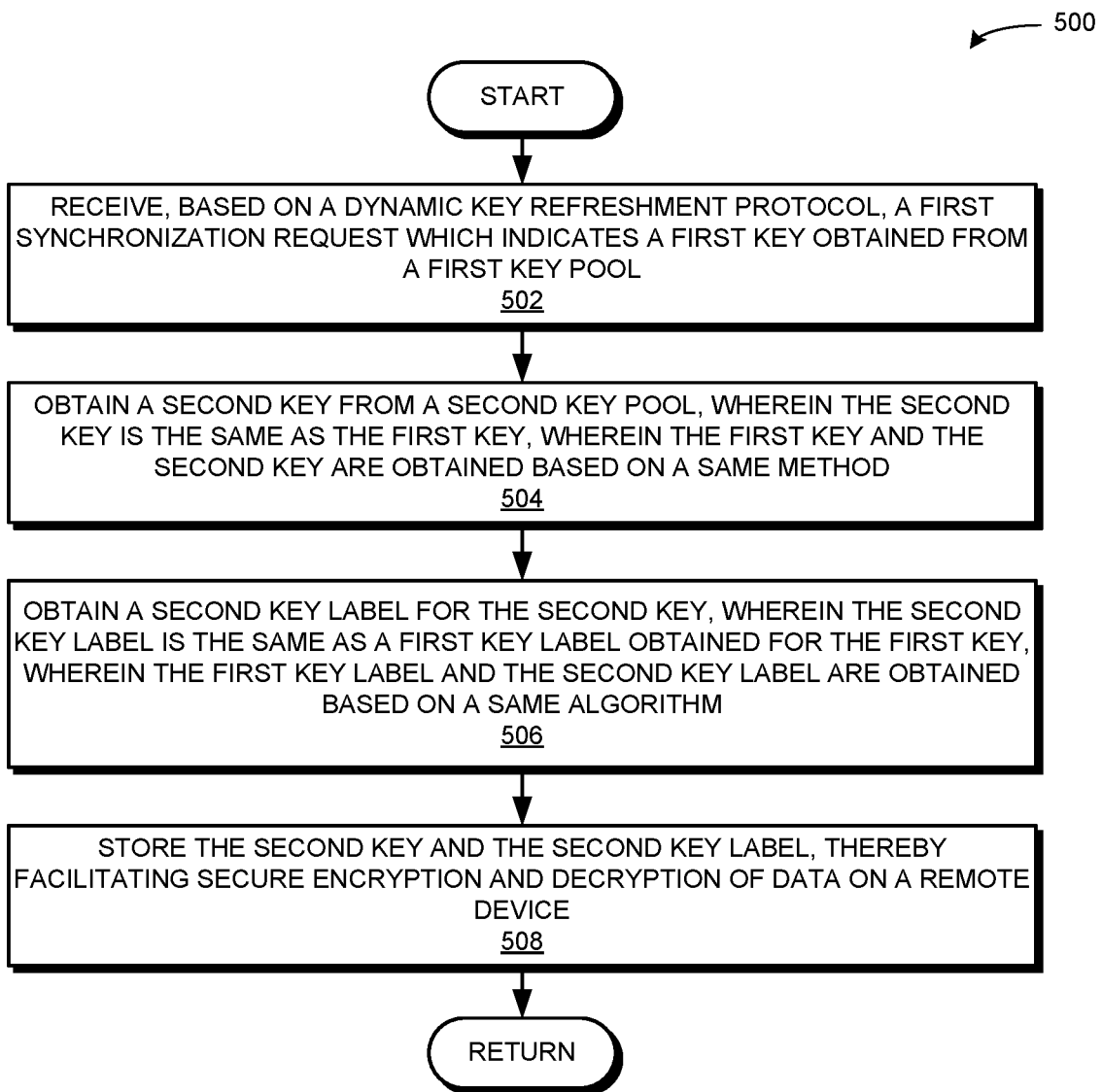
FIG. 5A presents a flowchart illustrating a method by a key-managing device for facilitating storage encryption and decryption, in accordance with an embodiment of the present application.

FIG. 5A presents a flowchart 500 illustrating a method by a key-managing device for facilitating storage encryption and decryption, in accordance with an embodiment of the present application. During operation, the system receives, based on a dynamic key refreshment protocol, a first synchronization request which indicates a first key obtained from a first key pool (operation 502). The system obtains a second key from a second key pool, wherein the second key is the same as the first key, wherein the first key and the second key are obtained based on a same method (operation 504). The system obtains a second key label for the second key, wherein the second key label is the same as a first key label obtained for the first key, wherein the first key label and the second key label are obtained based on a same algorithm (operation 506). The system stores the second key and the second key label, thereby facilitating secure encryption and decryption of data on a remote device (operation 508).

Figure 5B:
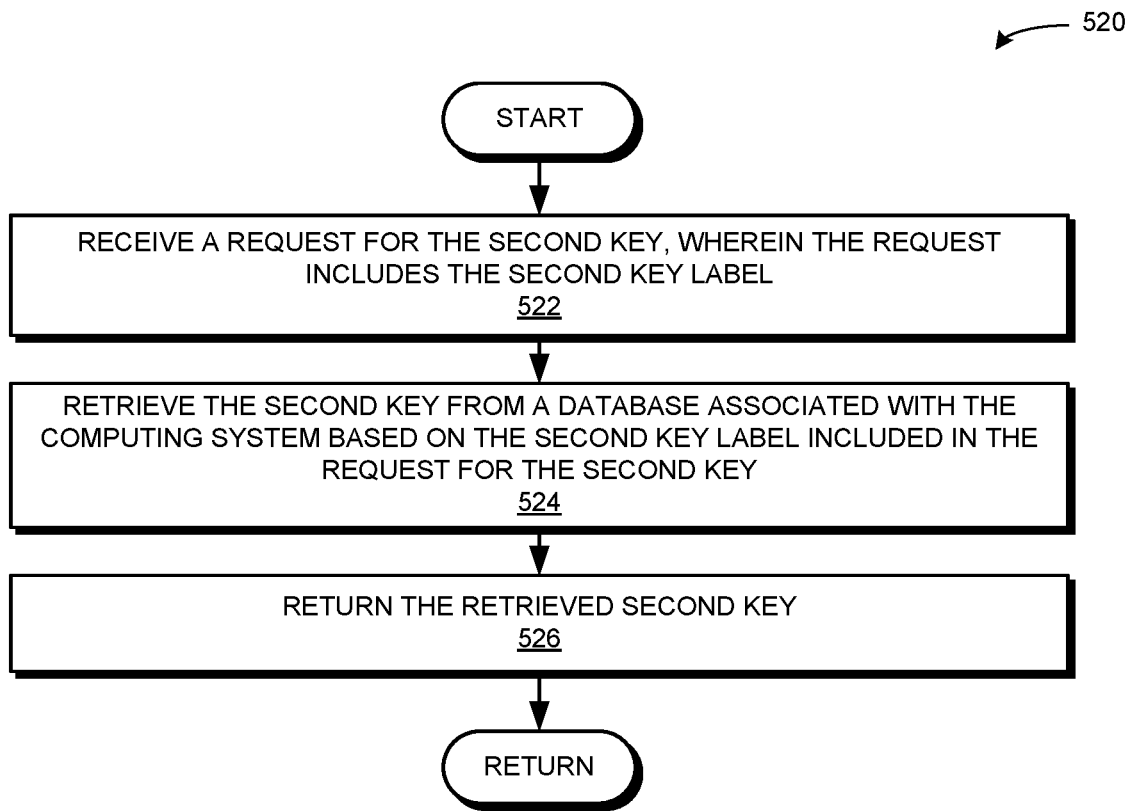
FIG. 5B presents a flowchart illustrating a method by a key-managing device for retrieving a key based on a corresponding key label, in accordance with an embodiment of the present application.

FIG. 5B presents a flowchart 520 illustrating a method by a key-managing device for retrieving a key based on a corresponding key label, in accordance with an embodiment of the present application. During operation, the system receives a request for the second key, wherein the request includes the second key label (operation 522). The system retrieves the second key from a database associated with the system based on the second key label included in the request for the second key (operation 524). The system returns the retrieved second key (operation 526).

Exemplary Computer System and Device

Figure 6:
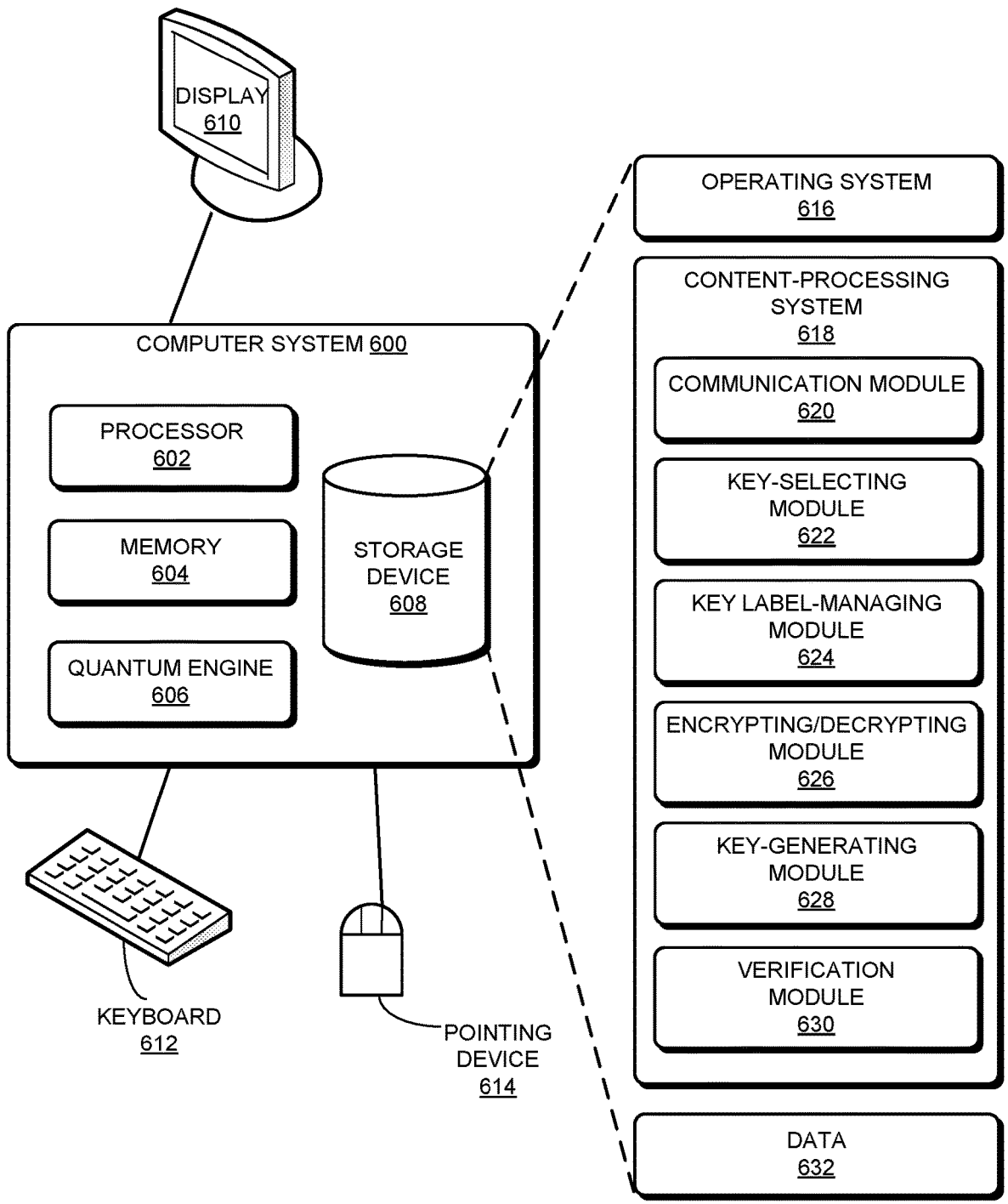
FIG. 6 illustrates an exemplary computer system that facilitates storage encryption and decryption, in accordance with an embodiment of the present application.

FIG. 6 illustrates an exemplary computer system 600 that facilitates storage encryption and decryption, in accordance with an embodiment of the present application. Computer system 600 includes a processor 602, a memory 604, a quantum engine 606, and a storage device 608. Memory 604 can include a volatile memory (e.g., RAM) that serves as a managed memory, and can be used to store one or more memory pools. Furthermore, computer system 600 can be coupled to a display device 610, a keyboard 612, and a pointing device 614. Quantum engine 606 can generate quantum keys and communicate via a quantum or photonic communication with another system by distributing and maintaining a same pool of keys. Storage device 608 can store an operating system 616, a content-processing system 618, and data 632.

Content-processing system 618 can include instructions, which when executed by computer system 600, can cause computer system 600 to perform methods and/or processes described in this disclosure. Specifically, content-processing system 618 can include: a communication module 620 for transmitting and receiving keys or requests which indicate data, keys, or key labels, including via a quantum or photonic communication; a key-selecting module 622 for updating a key based on a dynamic key refreshment protocol and for selected a most recently used key for an encryption operation; a key label-managing module 624 for generating key labels and for determining a key label for a key; an encrypting/decrypting module 626 for encrypting or decrypting data based on a key; a key-generating module 628 for generating key sequences or keys to be stored in a key pool; and a verification module 630 for verifying a key whose hash value is included in a request.

Data 632 can include any data that is required as input or that is generated as output by the methods and/or processes described in this disclosure. Specifically, data 632 can store at least: data to be encrypted and stored; a request to encrypt data to be stored on a storage device; a key; an updated key; a dynamic key refreshment protocol; a key label for a key; a key pool; a key sequence; a synchronization request; a predetermined time interval; an indicator of receiving a request; a method used to obtain a key from a key pool; an algorithm used to obtain or determine a key label for a key; a hash value; a hash value of a key; a request to decrypt encrypted data; a request for a key, where the request include a key label for the requested key; a database; encrypted data; decrypted data; and an encrypted or decrypted key or key label.

Figure 7:
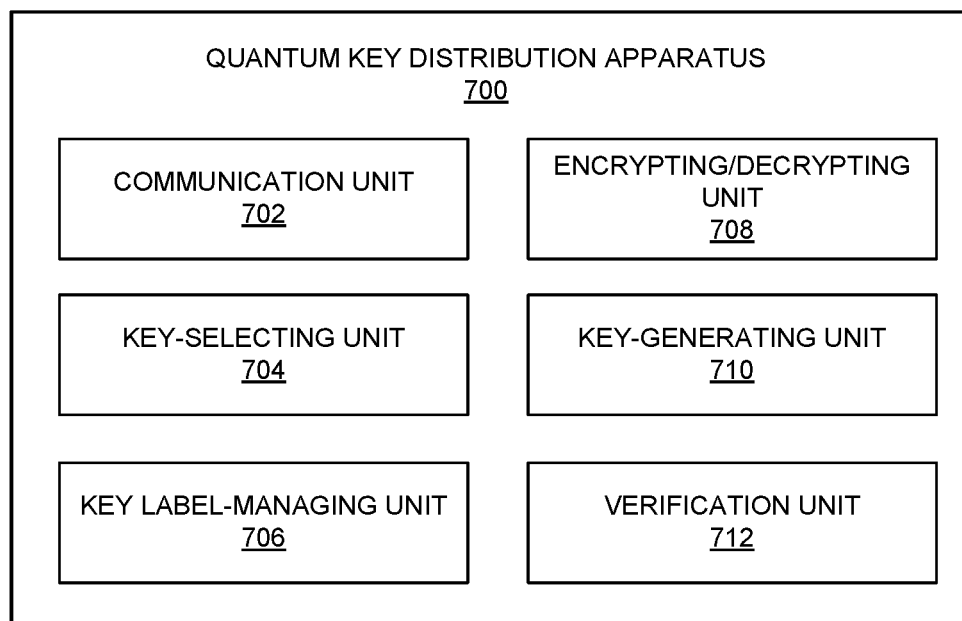
FIG. 7 illustrates an exemplary apparatus that facilitates storage encryption and decryption, in accordance with an embodiment of the present application.

FIG. 7 illustrates an exemplary apparatus 700 that facilitates storage encryption and decryption, in accordance with an embodiment of the present application. Apparatus 700 can comprise a plurality of units or apparatuses which may communicate with one another via a wired, wireless, quantum light, or electrical communication channel. Device 700 may be realized using one or more integrated circuits, and may include fewer or more units or apparatuses than those shown in FIG. 7. Further, device 700 may be integrated in a computer system, or realized as a separate device which is capable of communicating with other computer systems and/or devices. Specifically, device 700 can comprise units 702-712 which perform functions or operations similar to modules 620-630 of computer system 600 of FIG. 6, including: a communication unit 702; a key-selecting unit 704; a key label-managing unit 706; an encrypting/decrypting unit 708; a key-generating unit 710; and a verification unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating encryption, the system comprising:
   a processor; and
   a memory coupled to the processor and storing instructions, which when executed by the processor cause the processor to perform a method, the method comprising:
      receiving a first request to encrypt data, wherein the first request indicates the data to be encrypted;
      encrypting the data based on a first key;
      determining a first key label for the first key;
      transmitting the encrypted data and the first key label to a remote device; and
      responsive to receiving a second request which indicates the encrypted data and the first key label for the first key used to encrypt the data:
         obtaining a second key from a first key pool;
         encrypting, based on the second key, the first key label;
         transmitting a third request for the first key, wherein the third request includes the encrypted first key label; and
         receiving the first key, which is encrypted based on a third key which is the same as the second key.

2. The computer system of claim 1, wherein prior to transmitting the third request, the method further comprises:
generating a first synchronization request for a key-managing device, which causes the key-managing device to obtain from a second key pool of the key-managing device the third key which is the same as the second key.

3. The computer system of claim 1, wherein the method further comprises updating the first key based on a dynamic key refreshment protocol, which comprises:
obtaining a first new key from the first key pool;
transmitting a second synchronization request to the key-managing device, which causes the key-managing device to obtain from the second key pool of the key-managing device a second new key which is the same as the first new key; and
obtaining a first new key label for the first new key, wherein the first new key label is the same as a second new key label obtained for the second new key,
wherein the first new key is the key used to encrypt the data, and wherein the first new key label is the determined first key label.

4. The computer system of claim 3, wherein the dynamic key refreshment protocol is based on one or more of:
determining that a predetermined time interval has passed; and
receiving the first request.

5. The computer system of claim 3, wherein the first key is received from the key-managing device, wherein the first new key and the second new key are obtained based on a same method, and wherein the first new key label and the second new key label are obtained based on a same algorithm.

6. The computer system of claim 3, wherein the method further comprises:
computing a first hash value of the first new key; and
including the first hash value in the first synchronization request, which allows the key-managing device to verify the second new key by confirming that a second hash value of the second new key is the same as the first hash value.

7. The computer system of claim 6, wherein the method further comprises:
computing, by the key-managing device, the second hash value of the second new key; and
verifying the second new key by confirming that the second hash value is the same as the first hash value.

8. The computer system of claim 3, wherein the method further comprises:
receiving, by the key-managing device based on the dynamic key refreshment protocol, the second synchronization request which indicates the first new key obtained from the first key pool;
obtaining the second new key from the second key pool, wherein the second new key is the same as the first new key;
obtaining the second new key label for the second new key, wherein the second new key label is the same as the first new key label obtained for the first new key; and
storing the second new key and the second new key label, thereby facilitating secure encryption and decryption of data on a remote device.

9. The computer system of claim 8, wherein the second key and the second key label are stored in a database associated with the computing system, wherein the method further comprises:
receiving a fourth request for the second new key, wherein the fourth request includes the second key label;
retrieving the second new key from the database based on the second new key label included in the fourth request for the second new key; and
returning the retrieved second new key.

10. The computer system of claim 8, wherein the fourth request is received from a security device, wherein the retrieved second new key is returned to the security device, wherein the method further comprises:
prior to receiving the fourth request from the security device:
receiving, from the security device, a third synchronization request associated with a fourth key from the first key pool, wherein the second new key label included in the third request for the second key is encrypted based on the fourth key; and
obtaining, from the second key pool, a fifth key which is the same as the fourth key;
decrypting the encrypted second new key label based on the fifth key; and
prior to returning the retrieved second new key, encrypting the retrieved second new key based on the fifth key.

11. The computer system of claim 1, wherein the method further comprises:
generating, by a quantum engine of the computer system, one or more key sequences based on a quantum communication with a quantum engine of a key-managing device;
storing, by the computer system, the generated key sequences in a first key pool of the computer system;
storing, by the key-managing device, the generated key sequences in a second key pool of the key-managing device;
generating, by the computer system, a first key label for a respective key sequence in the first key pool; and
generating, by the key-managing device, a second key label for a respective key sequence in the second key pool,
wherein the first key label and the second key label are generated based on a same algorithm.

12. The computer system of claim 1, wherein the second request is a request to decrypt the encrypted data, and wherein the method further comprises:
decrypting, based on the second key, the encrypted received first key to obtain a decrypted first key; and
decrypting the encrypted data based on the decrypted first key.

13. A computer-implemented method for facilitating encryption, the method comprising:
receiving a first request to encrypt data, wherein the first request indicates the data to be encrypted;
encrypting the data based on a first key;
determining a first key label for the first key;
transmitting the encrypted data and the first key label to a remote device; and
responsive to receiving a second request which indicates the encrypted data and the first key label for the first key used to encrypt the data:
obtaining a second key from a first key pool;
encrypting, based on the second key, the first key label;
transmitting a third request for the first key, wherein the third request includes the encrypted first key label; and
receiving the first key, which is encrypted based on a third key which is the same as the second key.

14. The method of claim 13, wherein prior to transmitting the third request, the method further comprises:

generating a first synchronization request for a key-managing device, which causes the key-managing device to obtain from a second key pool of the key-managing device the third key which is the same as the second key.

15. The method of claim 13, wherein the method further comprises updating the first key based on a dynamic key refreshment protocol, which comprises:

obtaining a first new key from the first key pool;

transmitting a second synchronization request to the key-managing device, which causes the key-managing device to obtain from the second key pool of the key-managing device a second new key which is the same as the first new key; and obtaining a first new key label for the first new key, wherein the first new key label is the same as a second new key label obtained for the second new key, wherein the first new key is the key used to encrypt the data, and wherein the first new key label is the determined first key label.

16. The method of claim 15, wherein the method further comprises:

computing a first hash value of the first new key; and including the first hash value in the first synchronization request, which allows the key-managing device to verify the second new key by confirming that a second hash value of the second new key is the same as the first hash value.

17. The method of claim 15, wherein the method further comprises:

receiving, by the key-managing device based on the dynamic key refreshment protocol, the second synchronization request which indicates the first new key obtained from the first key pool;

obtaining the second new key from the second key pool, wherein the second new key is the same as the first new key;

obtaining the second new key label for the second new key, wherein the second new key label is the same as the first new key label obtained for the first new key; and storing the second new key and the second new key label, thereby facilitating secure encryption and decryption of data on a remote device.

18. The method of claim 13, wherein the method further comprises:

generating, by a quantum engine of the computer system, one or more key sequences based on a quantum communication with a quantum engine of a key-managing device;

storing, by the computer system, the generated key sequences in a first key pool of the computer system;

storing, by the key-managing device, the generated key sequences in a second key pool of the key-managing device;

generating, by the computer system, a first key label for a respective key sequence in the first key pool; and generating, by the key-managing device, a second key label for a respective key sequence in the second key pool, wherein the first key label and the second key label are generated based on a same algorithm.

\* \* \* \* \*